US012519745B2

(12) United States Patent
Lai et al.

(10) Patent No.: US 12,519,745 B2
(45) Date of Patent: Jan. 6, 2026

(54) NETWORK NODE CONFIGURATION METHOD AND APPARATUS, AND ACCESS REQUEST PROCESSING METHOD AND APPARATUS

(71) Applicant: Huawei Technologies Co., Ltd., Shenzhen (CN)

(72) Inventors: Zongyun Lai, Shenzhen (CN); Yusu Zhao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 19 days.

(21) Appl. No.: 18/758,704

(22) Filed: Jun. 28, 2024

(65) Prior Publication Data

US 2024/0356886 A1    Oct. 24, 2024

Related U.S. Application Data

(63) Continuation of application No. PCT/CN2022/142482, filed on Dec. 27, 2022.

(30) Foreign Application Priority Data

Dec. 31, 2021 (CN) .......................... 202111668414.8

(51) Int. Cl.
G06F 15/16 (2006.01)
H04L 61/09 (2022.01)
H04L 61/50 (2022.01)

(52) U.S. Cl.
CPC .............. *H04L 61/09* (2022.05); *H04L 61/50* (2022.05)

(58) Field of Classification Search
CPC ..... H04L 61/09; H04L 61/50; H04L 61/2596; H04L 61/00; H04L 67/133
See application file for complete search history.

(56) References Cited

U.S. PATENT DOCUMENTS

| | | | |
|---|---|---|---|
| 8,068,817 B1* | 11/2011 | Viswanath | H04L 61/4511 455/433 |
| 10,031,857 B2* | 7/2018 | Menachem | G06F 12/1009 |
| 10,250,493 B2* | 4/2019 | Boutros | G06F 9/5077 |
| 10,303,644 B2* | 5/2019 | Franke | H04L 67/1097 |
| 2004/0076121 A1* | 4/2004 | Yang | H04L 61/00 370/392 |
| 2004/0141468 A1* | 7/2004 | Christensen | H04L 61/5038 370/252 |
| 2007/0058642 A1* | 3/2007 | Eisink | H04L 61/00 370/401 |
| 2007/0162641 A1 | 7/2007 | Oztaskin et al. | |

(Continued)

*Primary Examiner* — Razu A Miah
(74) *Attorney, Agent, or Firm* — Conley Rose, P.C.

(57) ABSTRACT

A network node configuration method includes obtaining address information of a virtual address segment related to a target physical device, where the target physical device belongs to a second network node, the virtual address segment includes a first virtual address segment and a second virtual address segment, the first virtual address segment belongs to a virtual address space of a first network node and is used by the target physical device to access the first network node, and the second virtual address segment belongs to a virtual address space of the second network node and is used by the first network node to access the target physical device; and configuring an address mapping relationship.

14 Claims, 7 Drawing Sheets

(56) References Cited

U.S. PATENT DOCUMENTS

| | | | |
|---|---|---|---|
| 2013/0089092 A1* | 4/2013 | Dai | H04L 61/5046 |
| | | | 370/389 |
| 2016/0077976 A1* | 3/2016 | Raikin | G06F 13/28 |
| | | | 711/207 |
| 2018/0239726 A1 | 8/2018 | Wang et al. | |
| 2020/0387405 A1* | 12/2020 | Xiao | G06F 12/109 |

* cited by examiner

NETWORK NODE CONFIGURATION METHOD AND APPARATUS, AND ACCESS REQUEST PROCESSING METHOD AND APPARATUS

CROSS-REFERENCE TO RELATED APPLICATIONS

This is a continuation of International Patent Application No. PCT/CN2022/142482 filed on Dec. 27, 2022, which claims priority to Chinese Patent Application No. 202111668414.8 filed on Dec. 31, 2021. The disclosures of the aforementioned applications are hereby incorporated by reference in their entireties.

TECHNICAL FIELD

The present disclosure relates to the field of network technologies, and in particular, to a network node configuration method and apparatus, and an access request processing method and apparatus.

BACKGROUND

In a distributed computing scenario, one computing task may be collaboratively completed by a plurality of network nodes. For example, a first network node that initiates the computing task uses a physical device in a second network node to execute the task.

In a related technology, the first network node and the second network node are connected through a network bus that can provide a remote direct memory access (RDMA) service, and data transmission between the first network node and the second network node is implemented by using an RDMA technology. The first network node allocates a system memory space for the physical device in the second network node, the second network node allocates a system memory space for the physical device of the second network node, and data in the two system memory spaces is synchronized by using the RDMA technology. In this way, the first network node invokes the physical device in the second network node.

However, in such an interaction manner, steps are complex, and latency overheads are high.

SUMMARY

The present disclosure provides a network node configuration method and apparatus, and an access request processing method and apparatus, to implement access to a physical device across nodes, and help reduce a latency.

According to a first aspect, the present disclosure provides a network node configuration method. The method includes: obtaining address information of a virtual address segment related to a target physical device, where the target physical device is a physical device that belongs to a second network node, the virtual address segment includes a first virtual address segment and a second virtual address segment, the first virtual address segment belongs to a virtual address space of a first network node and is used by the target physical device to access the first network node, and the second virtual address segment belongs to a virtual address space of the second network node and is used by the first network node to access the target physical device; and configuring an address mapping relationship based on the address information of the virtual address segment, where the address mapping relationship includes a first address mapping relationship and a second address mapping relationship, the first address mapping relationship is a mapping relationship between a physical address space of the first network node and the second virtual address segment, and the second address mapping relationship is a mapping relationship between a physical address space of the second network node and the first virtual address segment.

The method may be performed by the first network node, or may be performed by the second network node.

In the present disclosure, the address mapping relationship is for transmission of an access request related to the target physical device. The access request is used to request to read data or write data. For example, an access request initiated by the first network node is used to request to write data to a virtual address that is in the second network node and that corresponds to the target physical device. For another example, an access request initiated by the target physical device is used to request to read data from or write data to a virtual address that is in the first network node and that corresponds to the target physical device.

In the present disclosure, an address mapping relationship related to a target physical device is configured, so that a network node can invoke a physical device across network nodes based on the configured address mapping relationship. Data in memory spaces of the two network nodes does not need to be synchronized by using an RDMA technology, thereby reducing a latency.

In the present disclosure, the address information of the virtual address segment includes a start address of the virtual address segment and a length of the virtual address segment. Alternatively, the address information of the virtual address segment includes a start address and an end address of the virtual address segment.

In the present disclosure, the virtual address segment related to the target physical device includes two parts. One part is the first virtual address segment allocated by the first network node for the target physical device, and the other part is the second virtual address segment allocated by the second network node for the target physical device.

For the first network node, the obtaining address information of a virtual address segment related to a target physical device includes: the first network node allocates the first virtual address segment to the target physical device, to obtain address information of the first virtual address segment; and the first network node obtains address information of the second virtual address segment allocated by the second network node to the target physical device. In some examples, the first network node may actively obtain the address information of the second virtual address segment, or receive the address information, sent by the second network node, of the second virtual address segment.

The configuring an address mapping relationship based on the address information of the virtual address segment includes: the first network node establishes the first address mapping relationship based on the address information of the second virtual address segment, and stores the first address mapping relationship; and the first network node sends the address information of the first virtual address segment to the second network node, so that the second network node maintains the second address mapping relationship. Herein, maintenance includes at least one of establishment and storage.

Manners for the second network node to obtain the address information of the virtual address segment and configure the address mapping relationship are similar to those of the first network node. For the second network node, the determining address information of a virtual address segment related to a target physical device includes: the second network node allocates the second virtual address segment to the target physical device, to obtain address information of the second virtual address segment; and the second network node obtains address information of the first virtual address segment allocated by the first network node to the target physical device.

The configuring an address mapping relationship based on the address information of the virtual address segment includes: the second network node establishes the second address mapping relationship based on the address information of the first virtual address segment, and stores the second address mapping relationship; and the second network node sends the address information of the second virtual address segment to the first network node, so that the first network node maintains the first address mapping relationship.

In the present disclosure, both the first network node and the second network node include a bus endpoint. A first bus endpoint in the first network node is configured to communicate with the second network node by using the first address mapping relationship, and a second bus endpoint in the second network node is configured to communicate with the first network node by using the second address mapping relationship.

The first address mapping relationship is a mapping relationship between the second virtual address segment and a physical address space that is in the first network node and that corresponds to the first bus endpoint. The first address mapping relationship may be stored by the first bus endpoint. The second address mapping relationship is a mapping relationship between the first virtual address segment and a physical address space that is in the second network node and that corresponds to the second bus endpoint. The second address mapping relationship may be stored by the second bus endpoint.

In the present disclosure, a physical address space in a network node is divided into two parts. One part corresponds to a local physical device, and the other part corresponds to a non-local physical device (that is, a physical device in another network node). For example, the physical device includes but is not limited to a storage device such as a memory and a peripheral device such as a Peripheral Component Interconnect Express (PCIe) device. A bus endpoint is responsible for the part of physical address space corresponding to the non-local physical device. When an access request including a virtual address is received and a physical address corresponding to the virtual address belongs to the physical address space for which the bus endpoint is responsible, the bus endpoint forwards the access request to the non-local physical device.

In some examples, the first network node may specify a virtual address in the virtual address space of the first network node to be accessed by the target physical device in the second network node. However, because the second network node cannot identify the virtual address in the virtual address space of the first network node, the virtual address in the virtual address space of the first network node needs to be translated into an input/output virtual address (IOVA) address that can be identified by the second network node, and then the IOVA is sent to the second network node. Therefore, an address translation relationship between an IOVA segment in the second network node and the first virtual address segment further needs to be configured in the first network node.

A manner of configuring the address translation relationship includes: receiving address information of an IOVA segment from the second network node, where the IOVA segment belongs to an input/output virtual address space that is in the second network node and that corresponds to the target physical device, and the IOVA segment corresponds to the first virtual address segment; and storing the address translation relationship between the first virtual address segment and the IOVA segment based on the address information of the IOVA segment.

In some examples, both the first virtual address segment and the IOVA segment are virtual address segments and include consecutive virtual addresses. Therefore, the address translation relationship may be an offset between a start address of the first virtual address segment and a start address of the IOVA segment, and the offset is a constant. In this way, the first network node can quickly translate a local virtual address into an IOVA in the second network node, thereby improving processing efficiency.

In some examples, the first network node stores a plurality of address translation relationships, and different address translation relationships correspond to different first virtual address segments and different IOVA segments. When the address translation relationship is implemented as an offset, offsets corresponding to different address translation relationships may be equal or unequal.

In the present disclosure, the first virtual address segment includes a first address sub-segment and a second address sub-segment, the first address sub-segment is used by the target physical device to initiate a direct memory access-based access request, and the second address sub-segment is used by the target physical device to initiate an interrupt request.

In some examples, the first network node determines the target physical device in the following manner: sending a get device request to a controller, where the get device request is used to request the controller to allocate a physical device; and receiving device indication information sent by the controller, where the device indication information indicates the target physical device allocated by the controller for the first network node based on the get device request, so that the first network node may determine the target physical device based on the device indication information.

In some examples, the second network node may determine the target physical device in either of the following manners: A first manner is receiving a device creation request sent by the first network node, where the device creation request includes indication information of the target physical device; and determining the target physical device based on the device creation request. A second manner is receiving allocation information sent by the controller, where the allocation information includes indication information of the target physical device and indication information of the first network node, and the allocation information indicates that the controller allocates the target physical device to the first network node; and determining the target physical device based on the allocation information.

In some examples, the controller stores information about a plurality of device resources. Each device resource is a physical device. These physical devices belong to one or more network nodes. The controller is configured to perform unified management on these physical devices, including addition, deletion, allocation, and reclaim of a physical device, to implement device resource pooling.

According to a second aspect, the present disclosure provides an access request processing method, applied to a source network node. The method includes: translating a first virtual address into a first physical address, where the first virtual address is a virtual address in a first access request; and sending a second access request to a destination network node based on the first physical address and a target address mapping relationship, where the second access request corresponds to the first access request, and the target address mapping relationship is configured by using the method according to any one of the first aspect or the possible implementations of the first aspect. The source network node is the first network node, the target address mapping relationship is the first address mapping relationship, and the first access request is an access request initiated by the first network node for the target physical device in the second network node; or the source network node is the second network node, the target address mapping relationship is the second address mapping relationship, and the first access request is an access request initiated by the target physical device for the first network node.

From a perspective of an upper-layer application, when the first network node accesses the local physical device, the first network node first translates a virtual address in an access request into a corresponding physical address, and then sends the access request to the local physical device based on the physical address. This is the same as a process in which the first network node accesses the non-local physical device. When the local physical device accesses a storage medium of the first network node, a virtual address in an access request initiated by the local physical device is translated into a corresponding physical address, to access the storage medium. Similarly, when the non-local physical device accesses the storage medium of the first network node, a virtual address in an access request is translated into a corresponding physical address, to access the storage medium. Therefore, with the access request processing method provided in the present disclosure, the first network node can implement unified management on an access mechanism of the local physical device and an access mechanism of the non-local physical device.

In some examples, the source network node is the first network node, the first access request further includes a target IOVA, the first access request indicates the target physical device to initiate access to the target IOVA, the target IOVA belongs to an IOVA segment, the IOVA segment belongs to an input/output virtual address space that is in the second network node and that corresponds to the target physical device, and corresponds to the first virtual address segment.

In some examples, the first network node stores an address translation relationship between the first virtual address segment and the IOVA segment, and the first network node determines the target IOVA based on the address translation relationship.

For example, the address translation relationship is an offset between a start address of the first virtual address segment and a start address of the IOVA segment, and the offset is a constant. In this case, the target IOVA may be obtained only by adding a target virtual address and the offset, thereby achieving high translation efficiency. Herein, the target virtual address is a virtual address in the first virtual address segment.

According to a third aspect, a network node configuration apparatus is provided, applied to a first network node or a second network node. The apparatus includes an obtaining module and a configuration module. The obtaining module is configured to obtain address information of a virtual address segment related to a target physical device. The target physical device is a physical device that belongs to the second network node, the virtual address segment includes a first virtual address segment and a second virtual address segment, the first virtual address segment belongs to a virtual address space of the first network node and is used by the target physical device to access the first network node, and the second virtual address segment belongs to a virtual address space of the second network node and is used by the first network node to access the target physical device. The configuration module is configured to configure an address mapping relationship based on the address information of the virtual address segment. The address mapping relationship is for transmission of an access request related to the target physical device, the address mapping relationship includes a first address mapping relationship and a second address mapping relationship, the first address mapping relationship is a mapping relationship between a physical address space of the first network node and the second virtual address segment, and the second address mapping relationship is a mapping relationship between a physical address space of the second network node and the first virtual address segment.

According to a fourth aspect, an access request processing apparatus is provided, applied to a source network node. The apparatus includes a translation module and a sending module. The translation module is configured to translate a first virtual address into a first physical address. The first virtual address is a virtual address in a first access request. The sending module is configured to send a second access request to a destination network node based on the first physical address and a target address mapping relationship. The second access request corresponds to the first access request, and the target address mapping relationship is configured by using the method according to the first aspect and the possible implementations of the first aspect. The source network node is the first network node, the target address mapping relationship is the first address mapping relationship, and the first access request is an access request initiated by the first network node for the target physical device in the second network node; or the source network node is the second network node, the target address mapping relationship is the second address mapping relationship, and the first access request is an access request initiated by the target physical device for the first network node.

According to a fifth aspect, a computer device is provided. The computer device includes a processor and a memory, the memory stores computer instructions, and the processor executes the computer instructions, to implement the method in the first aspect or the second aspect and the possible implementations of the first aspect or the second aspect.

According to a sixth aspect, a computer-readable storage medium is provided. The computer-readable storage medium stores computer instructions, and when the computer instructions in the computer-readable storage medium are executed by a computer device, the computer device is enabled to perform the method in the first aspect or the second aspect and the possible implementations of the first aspect or the second aspect.

According to a seventh aspect, a computer program product including instructions is provided. When the computer program product runs on a computer device, the computer device is enabled to perform the method in the first aspect or the second aspect and the possible implementations of the first aspect or the second aspect.

According to an eighth aspect, a chip is provided, including a processing circuit and an interface circuit. The interface circuit and the processing circuit are interconnected through a line. The interface circuit is configured to receive a signal from a storage medium, and send the signal to the processing circuit. The signal includes computer instructions stored in the storage medium. When the computer instructions are executed by the processing circuit, the processing circuit is enabled to perform the method in the first aspect or the second aspect and the possible implementations of the first aspect or the second aspect.

According to a ninth aspect, a communication system is provided, including a first network node and a second network node. Both the first network node and the second network node are configured to configure an address mapping relationship in a corresponding manner in the first aspect and the possible implementations of the first aspect.

In some examples, the first network node and the second network node are further configured to initiate, in a corresponding manner in the second aspect and the possible implementations of the second aspect, an access request related to a target physical device.

DESCRIPTION OF EMBODIMENTS

Figure 1:
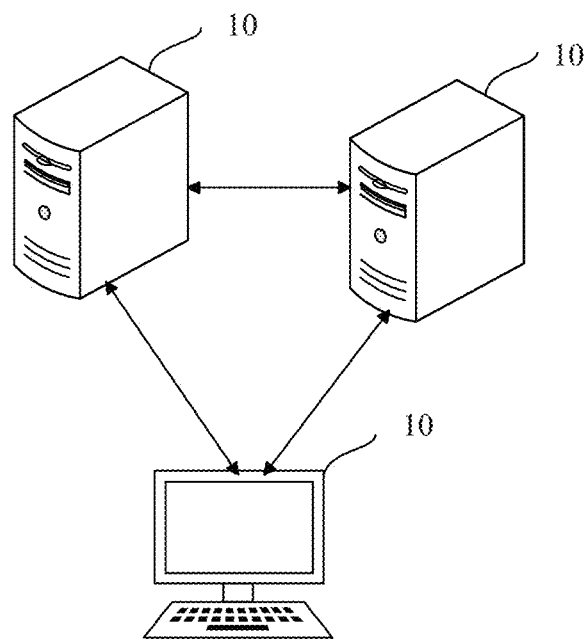
FIG. 1 is a schematic diagram of a network architecture of an application scenario according to an example embodiment of the present disclosure.

To make objectives, technical solutions, and advantages of the present disclosure clearer, the following further describes implementations of the present disclosure in detail with reference to accompanying drawings.

For ease of understanding embodiments of the present disclosure, the following first describes terms in embodiments of the present disclosure.

Network node: It is a device that has at least one of two functions: data processing and data storage. In embodiments of the present disclosure, the network node may be a complete physical machine, or may be a gateway, a switching device, or the like. Herein, the physical machine is a computer packaged into a product, for example, a server or a terminal. The terminal may include a desktop, laptop, handheld, or in-vehicle user terminal (UE) device, for example, a smartphone, a desktop computer, a tablet computer, a smart television, a smart television box, an ultra-mobile personal computer (UMPC), a notebook computer, a personal digital assistant (PDA), a portable multimedia player (PMP), a dedicated media player, a consumer communication device, a wearable device (for example, a smart watch), an augmented reality (AR) device, a virtual reality (VR) device, or other types of communication devices.

Physical device (referred to as a device below) in a network node: It is a part or a component in the network node. For example, when the network node is a physical machine, both a central processing unit (CPU) and a memory are physical devices in the network node. In the present disclosure, the physical device may be a peripheral device, for example, a PCIe device. The physical device includes but is not limited to an accelerator, a network communication device, and the like. For example, the accelerator includes but is not limited to an application-specific integrated circuit (ASIC), a field-programmable gate array (FPGA), a graphics processing unit (GPU), a digital signal processor (DSP), and the like. The network communication device includes but is not limited to a network adapter, an optical connector, or another transmitter, receiver, transceiver, or the like.

Global: A range indicated by the global is a group of nodes on which a bus endpoint described in embodiments of the present disclosure is deployed and that can read data from and write data to each other by using a method described in embodiments of the present disclosure. A location and a range of the group of nodes in actual space are not limited in embodiments of the present disclosure. For example, the group of nodes may be in a data center, or may be across data centers, or may be in an enterprise campus, or may be across cities or countries.

Address space: It may also be referred to as a storage space, which is one or more segments of addresses that can be used by a device or an instance. For example, a virtual address space of a device or an instance can be used by the device or the instance, which is one or more segments of virtual addresses that belong to the device or the instance. The virtual address space of the device or the instance is allocated by an operating system in which the device or the instance is located. For another example, a physical address space of a device or an instance is one or more segments of physical addresses allocated to the device or the instance for use. When the device or the instance uses the physical address space, another device or instance cannot use an address in the physical address space. The physical address space of the instance is allocated by an operating system that runs the instance. The allocation may be dynamic. For example, as the instance runs, an increasing physical address space is occupied, but there is an upper limit. The physical address space of the device usually has a fixed size and range.

Instance: It is a software module that can run an application program or a system program, and the software module can be referred to as an instance only when the software module is run by an operating system; otherwise, the software module is merely a segment of code. The instance may be expressed in a plurality of forms. For example, a process and a thread may be both understood as instances. The instance runs in a node.

CPU virtual address management mechanism: A CPU accesses a unit in a memory based on a virtual address. The CPU sends the virtual address, and a memory management unit (MMU) translates the received virtual address into a physical address based on a mapping relationship between the virtual address and the physical address, so that the CPU can access a memory space corresponding to the physical address. The virtual address sent by the CPU belongs to a virtual memory space allocated by the CPU to a process. A virtual address sent by a device belongs to an input/output (I/O) address space.

Peripheral address management mechanism: A device accesses a unit in a memory based on a virtual address. An input/output memory management unit (IOMMU) translates the received virtual address into a physical address based on a mapping relationship between the virtual address and the physical address, so that the peripheral device can access a memory space corresponding to the physical address.

Direct memory access (DMA): It is a working mode in which I/O switching is completely performed by hardware. In this mode, a DMA control device completely takes over control on a bus from a CPU, and data exchange is directly performed between a memory and an I/O device without the CPU. The DMA control device sends an address and a control signal to the memory, modifies an address, counts a quantity of transmitted bytes, and reports end of a transmission operation to the CPU in an interrupt mode.

Bus: A bus in a related technology is an internal structure of a computer, and is a common communication trunk for transmitting information between various functional components in the computer. The bus of the computer may be classified into a data bus, an address bus, and a control bus, to transmit data, an address of the data, and a control signal, respectively. In embodiments of the present disclosure, the bus is short for a high-performance interconnect bus (HPIB), which not only can connect various components inside a computer, but also can replace a network, that is, laid between different computers, to connect the different computers. Each computer accesses the high-performance interconnect bus through a bus endpoint. The bus endpoint is equivalent to a communication module such as a network adapter or a baseband antenna in a network technology. Specific structures of the HPIB and the bus endpoint are not described in detail in the present disclosure, provided that a request for reading data or writing data can be processed.

Memory semantics: It refers to a communication instruction used when components in a physical machine that are connected through a bus communicate with each other. Such communication is also referred to as bus communication, which is communication between different instances or devices that belong to a same operating system. Therefore, a network communication technology does not need to be used. For example, a load/store instruction is typical memory semantics.

Currently, communication technologies may be classified into network communication and bus communication. Information exchange in communication may be data transmission, or may be instruction transmission. Network communication is used for communication between a local device and a remote device, a transmitted packet is usually encapsulated by using a protocol stack in an operating system, and a network communication protocol is used. In network communication, information is usually transmitted by using a send/receive instruction in a network communication technology or a read/write instruction of RDMA. Before use of such semantics, a connection needs to be established first, which is referred to as connection establishment. When a cluster has a continuously increasing scale, connection establishment overheads are extremely high. In addition, although network semantics provided by RDMA bypass the protocol stack in a kernel of the operating system, and can effectively reduce an end-to-end network latency, an asynchronous notification mechanism of RDMA and a lengthy sending procedure of a network adapter still restrict further reduction of the latency. Bus communication is used for communication between components in a device that are connected through a bus. In bus communication, information is transmitted by using memory semantics (such as a load/store instruction). Such memory semantics do not have the foregoing limitations, so that bus communication has a faster communication speed than network communication.

The present disclosure proposes a method for accessing a target device based on virtual address addressing, to invoke a target physical device across network nodes based on memory semantics.

FIG. 1 is a schematic diagram of a network architecture of an application scenario according to an example embodiment of the present disclosure. A network shown in FIG. 1 includes a plurality of network nodes 10. The network nodes 10 have communication connections to each other.

The application scenario may be a cloud computing scenario or a distributed computing scenario. In the two computing scenarios, a program in a network node initiates a computing task or another task, and the computing task needs to be jointly completed by a plurality of network nodes 10.

In some examples, the network further includes a controller. The controller is connected to each network node 10 through a network. The controller is configured to: obtain and maintain information about a physical device of each network node 10, and perform unified management, for example, allocation and reclaim, on the physical device of each network node 10.

In some other examples, functions of the controller are integrated into a network node 10.

Figure 2:
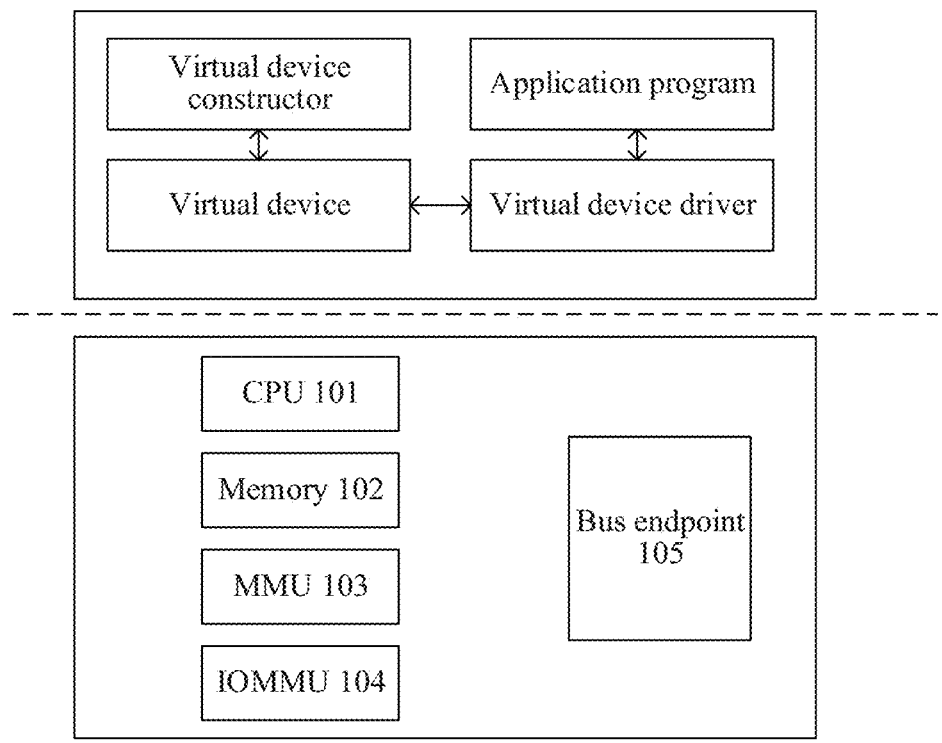
FIG. 2 is a schematic diagram of a structure of a network node according to an example embodiment of the present disclosure.

FIG. 2 is a schematic diagram of a structure of a network node according to an example embodiment of the present disclosure. As shown in FIG. 2, the network node includes two parts: hardware and software. It should be understood that the architecture shown in FIG. 2 is merely for ease of understanding, and is not a limitation on an architecture that can be used by the network node in the present disclosure. Another software part (such as an operating system) and another hardware part (such as a display) in the network node are not displayed.

The hardware part includes a CPU 101, a memory 102, an MMU 103, an IOMMU 104, and a bus endpoint 105. The CPU 101, the memory 102, and the bus endpoint 105 are connected to each other through a bus.

The CPU 101 and the MMU 103 are generally packaged into a chip. The CPU 101 runs an application, and initiates a request for reading data or writing data, which may also be referred to as a memory access request, that is, a request for accessing a storage medium, because an address in the storage medium (for example, the memory) needs to be found for reading data or writing data. The MMU is responsible for address translation of a request initiated by the CPU to access the memory, that is, translating a virtual address in the memory access request into a physical address.

For the memory 102, in FIG. 2, the memory is used as an example to show a storage medium in the node, and a physical form of the memory may be a memory module. In a method in the present disclosure, in addition to being provided to a local instance (for example, a process) for use, the memory may be used by an instance of another node. A manner of being used by the instance of the another node is to write data to the memory by using a request and the method described in the present disclosure, or request to read data in the memory.

A function of the IOMMU 104 is similar to that of the MMU 103, but the IOMMU is responsible for address translation of a memory access request of hardware other than the CPU. For example, if the hardware is the memory, the memory access request is used to request to write data to the memory, or request to read data in the memory. The hardware other than the CPU may alternatively be another device having DMA.

The bus endpoint 105, referred to as an endpoint (EP), is configured to connect the network node to a high-performance interconnect bus, and functions as a network adapter. The bus endpoint is usually a hardware module having an address translation function, which is similar to a network adapter. The bus endpoint also needs a driver installed in an operating system of the network node, so that the operating system of the network node can use the bus endpoint. One network node may include a plurality of bus endpoints, which is exactly as a plurality of network adapters may be installed in one network node. A network node may include both a bus endpoint and a network adapter. In FIG. 2, no network adapter is drawn, and only the bus endpoint is shown as an example. If remote communication of the network node is all performed through the high-performance interconnect bus, that is, information is exchanged by using memory semantics, the node may include only the bus endpoint. During actual cabling, the bus endpoint may have one end connected to the CPU, the memory, or the MMU, and another end connected to the high-performance bus or a switch of the high-performance bus.

In embodiments of the present disclosure, the physical device is an I/O device that supports memory semantics. The device includes a management unit and a data processing unit. The management unit is configured to process a device configuration operation initiated by software. The data processing unit is configured to process a data operation initiated by a device, for example, a DMA operation and an interrupt operation that are visible to the software.

The network node runs program code such as an application program, a virtual device (vdev) constructor, a virtual device driver, and the driver of the bus endpoint. Herein, the application program is an application program that needs to use a device, and obtains, by applying to a controller, a right to use a target device. The target device may be a device of the network node in which the application program is located, or a device of a network node other than the network node in which the application program is located. The virtual device constructor is configured to construct a local virtual device based on a requirement of the application program. The virtual device driver is configured to manage the virtual device. The driver of the bus endpoint is a software module that is in a kernel of the operating system (OS) running in the network node and that is configured to drive the bus endpoint that is a hardware module. The driver has a same function as a driver of other hardware to enable the operating system to sense and use corresponding hardware. In addition, the driver is further configured to configure or update an address mapping relationship used by the bus endpoint.

Figure 3:
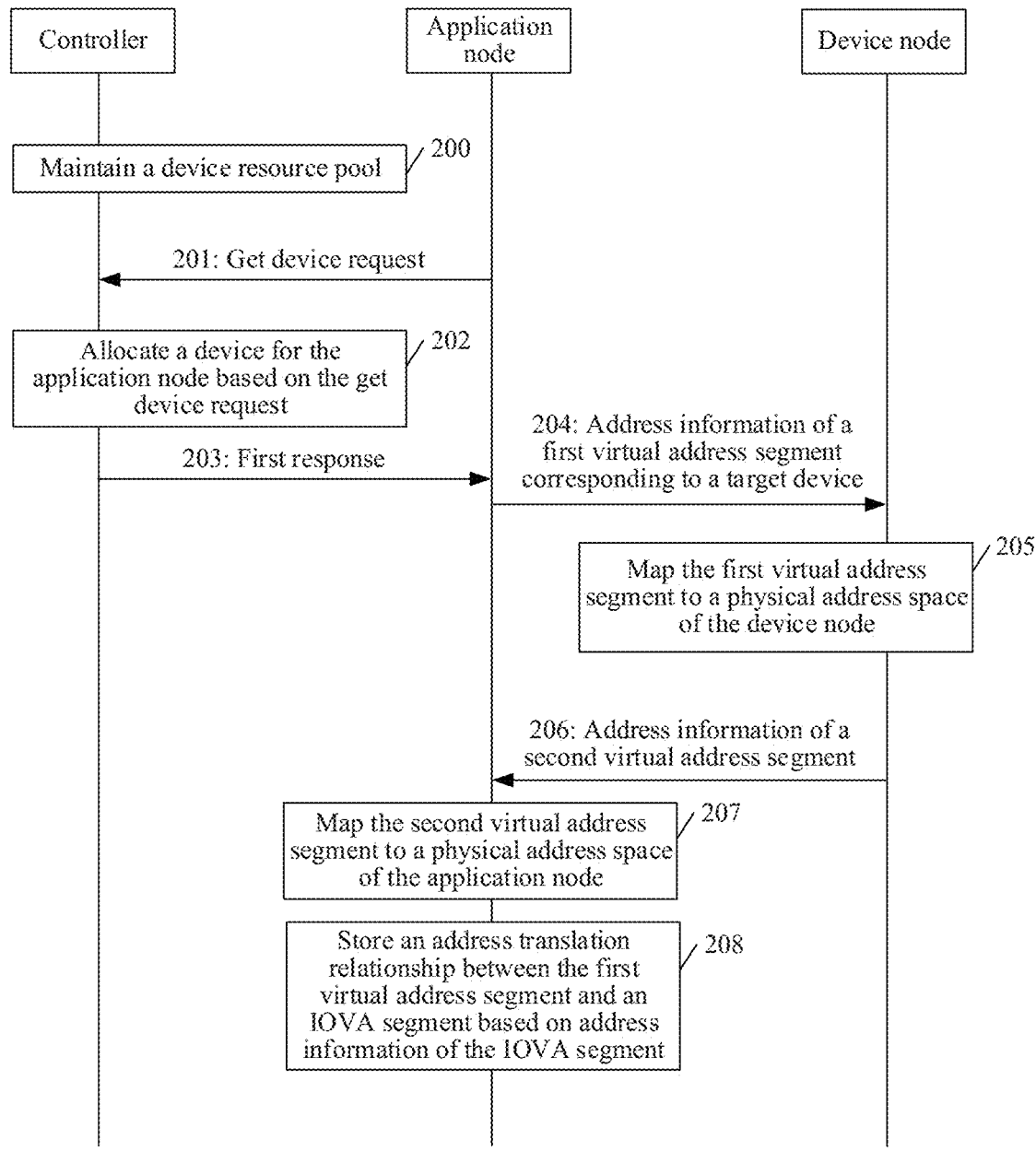
FIG. 3 is a schematic diagram of a network node configuration method according to an example embodiment of the present disclosure.

FIG. 3 shows a network node configuration method according to an example embodiment of the present disclosure. In the method, an application node is a first network node, and a device node is a second network node. Each of the first network node and the second network node is any network node in FIG. 1. As shown in FIG. 3, the method includes the following several processes.

200: A controller maintains a device resource pool.

The device resource pool includes a plurality of devices, and the devices in the device resource pool belong to one or more network nodes.

Maintaining the device resource pool includes managing information about each device in the device resource pool. The information about the device includes an identifier of a network node in which the device is located, an identifier of the device, an identifier of a bus endpoint in the network node in which the device is located, and the like. The identifier of the network node includes but is not limited to an Internet Protocol (IP) address, a media access control (MAC) address, or the like of the network node. The identifier of the device includes but is not limited to a serial number or the like of the device, provided that the device can be uniquely identified in the device resource pool. The identifier of the bus endpoint includes but is not limited to a serial number or the like of the bus endpoint, provided that the bus endpoint can be uniquely identified globally.

In some examples, the information about the device further includes at least one of device attribute information and network configuration information. The device attribute information includes at least one of a device type, a device memory size, a device computing capability, and a quantity of input/output units. The device type includes but is not limited to a network adapter, an accelerator, an x-processing unit (XPU) (for example, a GPU), and the like. The device memory size is determined by the device type, device configuration, and the like, and is not limited herein. The device computing capability includes but is not limited to a quantity of cores. The quantity of input/output units includes but is not limited to a context of the GPU, a quantity of queues of the network adapter, and the like. The network configuration information includes at least one of a bandwidth and a latency of the network node to which the device belongs.

In some examples, the information about the device further includes status information of the device. The status information of the device indicates whether the device is occupied. When the status information of the device indicates that the device is occupied, the information about the device further includes an identifier of a network node that occupies the device, and the like.

In this embodiment of the present disclosure, the controller maintains the device resource pool based on information that is reported by each network node and that is about a device. That is, step 200 includes: the controller receives information that is sent by each network node and that is about a device, and updates information about the device in the device resource pool based on the received device information.

When a network node is started, device discovery scan is performed to obtain information about a device included in the network node, and the information about the device is sent to the controller.

In a working process of the network node, a bus driver of the network node monitors a hot plugging/unplugging event of a device. After the bus driver detects a hot plugging/unplugging event of a device, device change information is sent to a device management process of the network node, and the network node sends the device change information to the controller through the device management process. The device change information indicates that the device is added and/or deleted.

For example, the device management process is a user-mode device management process in an operating system.

For example, the device management process is a virtual device daemon in a Linux system.

201: The application node sends a get device request to the controller.

The application node is a network node in which an instance that initiates a task is located. The instance is usually run by a CPU of the application node. The get device request is used to request the controller to allocate a device.

In some examples, the get device request carries device description information. The device description information includes at least one of device attribute information, a network configuration requirement, and a preference setting.

For related content of the device attribute information, refer to 200. A detailed description is omitted herein. The network configuration requirement includes at least one of a bandwidth requirement and a latency requirement. The preference setting may be local only, any, or the like. The local only indicates that a device of the application node is requested, and the any indicates that a device of the application node or a device of another network node other than the application node is requested.

For example, the instance invokes a GET_DEVICE application programming interface (API), and sends the device description information as a function parameter of the GET_DEVICE API to the controller, to send the get device request to the controller.

Correspondingly, the controller receives the get device request.

It should be noted that, after sending the get device request, the application node is synchronously blocked, and waits for a result to be returned.

202: The controller allocates a device for the application node based on the get device request.

The device allocated to the application node is a target device.

Figure 4:
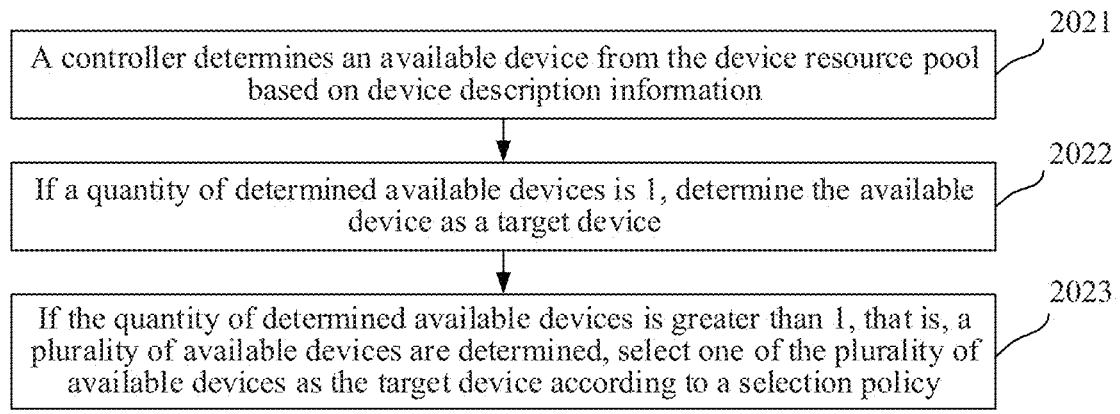
FIG. 4 is a schematic diagram of a device allocation process according to an example embodiment of the present disclosure.

FIG. 4 is a schematic diagram of a device allocation process according to an example embodiment of the present disclosure. As shown in FIG. 4, in some examples, the controller allocates a device to the application node in the following manner:

2021: The controller determines an available device from the device resource pool based on the device description information. The available device is a device that matches the device description information in the get device request.

2022: If a quantity of determined available devices is 1, determine the available device as the target device.

2023: If the quantity of determined available devices is greater than 1, that is, a plurality of available devices are determined, select one of the plurality of available devices as the target device according to a selection policy.

In some examples, the selection policy is a default policy, and the default policy is selecting a target device based on network configuration information, for example, using a device with a lowest latency as the target device. For another example, a device with a maximum bandwidth is used as the target device.

In some other examples, the selection policy is generated based on the preference setting. For example, an available device satisfying a specified condition is selected from available devices corresponding to the preference setting as the target device. For example, if the preference setting is local only, and the specified condition is a lowest latency, a device that belongs to the application node and has a lowest latency is selected from the plurality of available devices as the target device.

The foregoing selection policy is merely an example. The selection policy is not limited in the present disclosure, provided that the target device can be determined.

203: The controller sends a first response to the application node.

Correspondingly, the application node receives the first response.

In some examples, if the target device is determined in 202, the first response includes indication information of the target device. The target device is a device allocated to the application node.

In some other examples, if the target device cannot be determined in 202, that is, the quantity of available devices determined by the controller from the device resource pool is 0, 203 may be replaced with that the controller sends a second response to the application node. The second response indicates a get device failure. If the application node receives the second response, the application node resends a get device request to the controller, or exits the current procedure.

For example, the second response does not include the indication information of the target device.

After receiving the first response or the second response, the application node generates a return value of the GET_DEVICE API based on the received response, to complete invocation of the GET DEVICE API. The return value includes a device pointer and an operation status value. For example, in a return value corresponding to the first response, a device pointer points to the target device, and an operation status value indicates that the get device request succeeds. For example, the operation status value is SUCCESS. In a return value corresponding to the second response, a device pointer is not defined, that is, the device pointer is null, and an operation state value indicates that the get device request fails. For example, the operation state value is FAILURE.

204: The application node sends, to the device node based on the first response, address information of a first virtual address segment corresponding to the target device.

Herein, the first virtual address segment belongs to a virtual address space of the first network node and is used by the target physical device to access the first network node.

204 may include: the application node allocates the first virtual address segment for the target device based on the first response, to obtain the address information of the first virtual address segment; and sends, to the device node, the address information of the first virtual address segment corresponding to the target device. Herein, the application node may allocate the first virtual address segment for the target device from a virtual address space corresponding to the instance.

In this embodiment of the present disclosure, the first virtual address segment includes a first address sub-segment and a second address sub-segment. The first address sub-segment is used by the target physical device to initiate a DMA-based access request, and may be referred to as a DMA memory segment. The second address sub-segment is used by the target physical device to initiate an interrupt request, and may be referred to as an interrupt memory segment.

The DMA memory segment includes a DMA I/O virtual address for the target device to subsequently initiate a DMA read/write operation. The interrupt memory segment includes an interrupt vector table based on memory semantics for the target device to subsequently initiate an interrupt to the application node. The interrupt vector table is a message signal interrupt (MSI) or MSI-X interrupt vector table. MSI-X is an extension and enhancement of MSI. Herein, the interrupt vector table is a specific memory region for storing an interrupt vector.

In this embodiment of the present disclosure, the address information of the virtual address segment includes a start address of the virtual address segment and a length of the virtual address segment. Alternatively, the address information of the virtual address segment includes a start address and an end address of the virtual address segment.

In some examples, after receiving the first response, the application node sends a memory region (MR) creation request to the controller, and receives MR information returned by the controller. The MR information indicates an MR corresponding to the target device.

Then, the application node sends address information of the DMA memory segment and address information of the interrupt memory segment to the controller, to register the address information of the DMA memory segment and the address information of the interrupt memory segment in the MR. Both the DMA memory segment and the interrupt memory segment are parts of the MR. Subsequently, the device node obtains the address information of the DMA memory segment and the address information of the interrupt memory segment by accessing the MR. In this way, the address information of the DMA memory segment and the address information of the interrupt memory segment are sent to the device node.

In this embodiment of the present disclosure, the MR is a concept at a logical or code level, and represents a segment of consecutive virtual addresses. The MR is globally visible, that is, all network nodes can access the MR. The controller is configured to maintain an MR directory, for example, including start addresses and lengths of a plurality of MRs. The MR directory records a plurality of MRs in a domain in which the controller is located, so that the controller can perform unified management on the MRs in the domain.

One MR may be divided into a plurality of memory segments (MS). The MS may be identified by an offset and a length. The offset is an offset of the MS relative to a start address of the MR, and the length is a length of the MS, that is, a size of the memory segment. Each MS corresponds to a segment of physical memory whose length is equal to a length of the MS.

For example, the application node may send the MR creation request to the controller through a virtual device constructor vdev constructor.

In some examples, the application node sends a device creation request to the device node. The device creation request includes the MR information and indication information of the target physical device. Correspondingly, the device node receives the device creation request. The device node obtains the address information of the first virtual address segment from the MR indicated by the MR information. For example, the device node opens, by using a vdev constructor, the MR indicated by the MR information, to obtain the address information of the first virtual address segment.

In some other examples, after receiving the first response, the application node directly sends the address information of the first virtual address segment to the device node. Correspondingly, the device node receives the address information of the first virtual address segment.

205: The device node maps the first virtual address segment to a physical address space of the device node.

That is, the device node maintains a second address mapping relationship based on the received address information of the first virtual address segment, for example, performs at least one of establishment and storage of the second address mapping relationship. The second address mapping relationship is a mapping relationship between the physical address space of the device node and the first virtual address segment. For example, the device node stores the second address mapping relationship into a bus endpoint of the device node. In this way, the bus endpoint is subsequently responsible for a first physical address segment corresponding to the DMA memory segment and the interrupt memory segment. Subsequently, if the target physical device initiates a request for accessing the first virtual address segment (for example, the DMA memory segment or the interrupt memory segment), the request is forwarded to the bus endpoint.

For example, the second address mapping relationship is a mapping relationship between the first virtual address segment and a physical address space that is in the device node and that corresponds to the bus endpoint of the device node.

In addition, an IOMMU of the device node stores a fourth address mapping relationship. The fourth address mapping relationship is a mapping relationship between an IOVA space corresponding to the target device and the physical address space of the device node. In this way, when translating an IOVA corresponding to a received access request to obtain a physical address belonging to the first physical address segment, the IOMMU can forward the access request to the bus endpoint.

206: The device node sends address information of a second virtual address segment to the application node.

The second virtual address segment belongs to a virtual address space of the second network node and is used by the first network node to access the target physical device.

206 may include: the device node allocates the second virtual address segment for the target device, to obtain the address information of the second virtual address segment; and sends, to the application node, the address information of the second virtual address segment corresponding to the target device.

In some examples, the second virtual address segment is used to write a configuration operation for the target device, and may also be referred to as a configuration space memory segment. For example, the device node may obtain address information of the configuration space memory segment through a management driver of the target device.

In some examples, the application node actively obtains the address information of the second virtual address segment. For example, that the device node sends address information of a second virtual address segment to the application node includes: the device node writes the address information of the second virtual address segment into a corresponding MR, and the application node accesses the MR, to obtain the address information of the second virtual address segment.

In another embodiment, the device node may alternatively directly send the address information of the second virtual address segment to the application node. Correspondingly, the application node receives the address information of the second virtual address segment.

In some examples, the device node further sends address information of an IOVA segment to the application node. The address information of the IOVA segment is, for example, a start address of the IOVA segment. The IOVA segment belongs to the IOVA space that is in the second network node and that corresponds to the target physical device, and corresponds to the first virtual address segment.

In some examples, the device node puts the address information of the second virtual address segment and the address information of the IOVA segment into a response to the device creation request, and sends the response to the application node.

For example, the device node sends the response to the vdev constructor of the application node through the vdev constructor.

207: The application node maps the second virtual address segment to a physical address space of the application node.

That is, the application node maintains a first address mapping relationship based on the received address information of the second virtual address segment, for example, performs at least one of establishment and storage of the first address mapping relationship. The first address mapping relationship is a mapping relationship between the physical address space of the application node and the second virtual address segment. For example, the application node stores the first address mapping relationship into a bus endpoint of the application node. The first address mapping relationship is a mapping relationship between the second virtual address segment and a physical address space that is in the application node and that corresponds to the bus endpoint of the application node.

In addition, an MMU of the application node stores a third address mapping relationship. The third address mapping relationship is an address mapping relationship between the virtual address space corresponding to the instance and the physical address space of the application node.

208: The application node stores an address translation relationship between the first virtual address segment and the IOVA segment based on the address information of the IOVA segment.

In some examples, the address translation relationship is an offset between a start address of the first virtual address segment and a start address of the IOVA segment, and the offset is a constant. A vdev of the application node may store the offset, and efficiently translate, during an I/O operation, a local virtual address into a virtual address that can be identified by the target device, thereby improving processing efficiency. For example, a target IOVA may be obtained by adding a target virtual address and the offset, thereby achieving high translation efficiency. Herein, the target virtual address is a virtual address in the first virtual address segment.

In some examples, the application node stores a plurality of address translation relationships, and different address translation relationships correspond to different first virtual address segments and different IOVA segments. When the address translation relationship is implemented as an offset, offsets corresponding to different address translation relationships may be equal or unequal.

After the second address mapping relationship is established and stored, the application node constructs a virtual device corresponding to the target device. The vdev constructor of the application node enables, through bus rescan, a device bus to discover the virtual device, and loads a driver corresponding to the virtual device. The driver of the virtual device can perform unified management on local or remote devices.

In this way, the application node completes creation of the virtual device corresponding to the target device, and establishment of the memory-based address mapping relationship. Subsequently, the application node may access the target device based on the address mapping relationship, and the target device may also access the application node based on the address mapping relationship.

It should be noted that, in the foregoing processes 205 to 208, the device node and the application node are different network nodes. In another example, a device node and an application node may be a same network node, and a target device belongs to the application node, that is, an instance invokes a device of a network node in which the instance is located to complete a computing task. In this case, if a virtual address segment is managed by using an MR, the application node needs to register, in the MR, address information of both a first virtual address segment and a second virtual address segment that correspond to the target device.

An embodiment of the present disclosure further provides an access request processing method. The method is implemented based on the foregoing established address mapping relationship.

Figure 5:
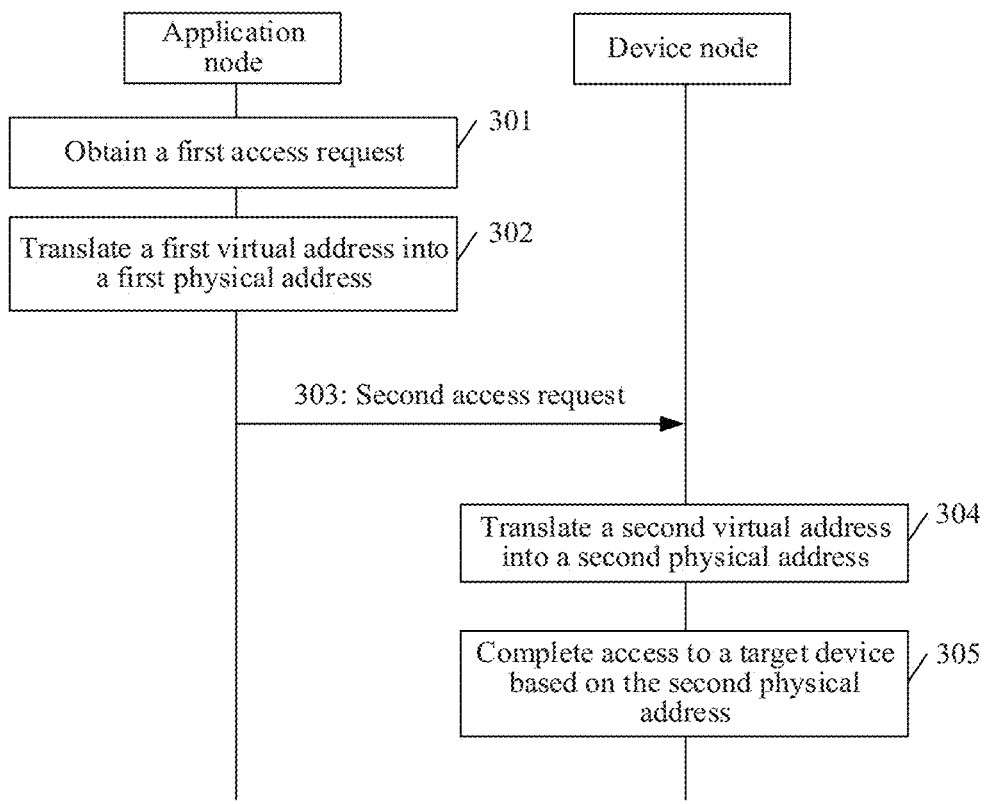
FIG. 5 is a flowchart of an access request processing method according to an example embodiment of the present disclosure.

FIG. 5 is a schematic diagram of an access request processing method according to an example embodiment of the present disclosure. In the method, an application node is a first network node, and may also be referred to as a source network node, and a device node is a second network node, and may also be referred to as a destination network node. As shown in FIG. 5, the method includes the following steps.

301: The application node obtains a first access request.

The first access request includes a first virtual address. The first virtual address is an address in a virtual address space corresponding to a process of an application program.

In some examples, the first access request is used to write configuration operation data into an address space corresponding to a target device in the device node, to perform a configuration operation on the target device. The configuration operation includes but is not limited to device initialization (interrupt vector configuration), I/O operation configuration (DMA descriptor and payload configuration), and the like.

In some other examples, the first access request carries a target IOVA. The first access request indicates the target physical device to initiate access to the target IOVA, that is, the first access request indicates the target device to write data to or read data from the target IOVA.

Because the target IOVA belongs to an IOVA segment, the IOVA segment belongs to an IOVA space that is in the device node and that corresponds to the target physical device, and corresponds to the first virtual address segment (for example, corresponds to the DMA memory segment), the first access request essentially indicates the target device to write data to a virtual address in the first network node or read data from the virtual address.

In this case, before step 301, the method further includes: determining the target IOVA based on an address translation relationship between the first virtual address segment and the IOVA segment, so that the target IOVA is carried in the first access request. For related content of the address translation relationship, refer to the foregoing step 208. A detailed description is omitted herein.

302: The application node translates the first virtual address into a first physical address.

For example, 302 includes: a CPU of the application node sends the first access request to an MMU of the application node; and the MMU of the application node translates the first virtual address into the first physical address.

The MMU of the application node stores a third address mapping relationship. The third address mapping relationship is an address mapping relationship between a virtual address space corresponding to the instance and a physical address space of the application node. The MMU of the application node translates the first virtual address into the first physical address based on the third address mapping relationship.

The physical address space of the application node includes two types of physical address segments. A first-type physical address segment corresponds to a local device of the application node, and a second-type physical address segment corresponds to a non-local device. The second-type physical address segment is referred to as a first physical address segment below. The first physical address segment is a segment of physical addresses for which a bus endpoint of the application node is responsible.

303: When the first physical address belongs to the first physical address segment, the application node sends a second access request based on the first physical address.

For example, 303 includes:

Step 1: The MMU of the application node sends the first access request to the bus endpoint of the application node.

The first access request carries the first physical address. Because the first physical address belongs to the first physical address segment, the MMU sends the first access request carrying the first physical address to the bus endpoint of the application node through an internal bus of the application node. Correspondingly, the bus endpoint of the application node receives the first access request.

Step 2: The bus endpoint of the application node translates the first physical address into a second virtual address based on a first address mapping relationship.

The second virtual address is a virtual address that is in the device node and that corresponds to the target device, that is, a virtual address in the configuration space memory segment (that is, the second virtual address segment). The bus endpoint of the application node stores the first address mapping relationship. The first address mapping relationship is an address mapping relationship between the first physical address segment and the configuration space memory segment in the device node.

Step 3: The bus endpoint of the application node sends the second access request to the device node.

The second access request carries the second virtual address. An access type corresponding to the second access request is the same as that corresponding to the first access request. The access type includes reading data or writing data. Correspondingly, a bus endpoint of the device node receives the second access request.

It should be noted that the second access request may further include an identifier of the bus endpoint of the device node. The identifier of the bus endpoint is equivalent to a bus address, so that the second access request can be sent to a destination end. A bus endpoint identifier indicates a bus endpoint, and is unique in a domain. Therefore, an identifier of a bus endpoint in a domain may also be referred to as a global identifier (GID) in the domain. In some implementations, the bus endpoint identifier may be configured to be globally unique. In this way, it is equivalent to indicating which bus endpoint is to receive the second access request. Because one node may include a plurality of bus endpoints, no node identifier is used. Identifiers of bus endpoints may be all allocated by a controller in a domain.

304: The device node translates the second virtual address into a second physical address.

For example, 304 includes: after receiving the second access request, the bus endpoint of the device node sends the second access request to an IOMMU of the device node; and the IOMMU of the device node translates the second virtual address into the second physical address.

The second physical address is a physical address in a physical address space of the device node. The IOMMU of the device node stores a fourth address mapping relationship. The fourth address mapping relationship is a mapping relationship between the IOVA space that is in the device node and that corresponds to the target device and the physical address space of the device node. The IOMMU of the device node translates the second virtual address into the second physical address based on the fourth address mapping relationship.

305: The device node completes access to the target device based on the second physical address.

For example, the configuration operation data is written into a configuration space of the target device of the device node.

The application node may complete initialization of the target device by accessing the configuration space of the target device, and then invoke the target device to execute a task.

Figure 6:
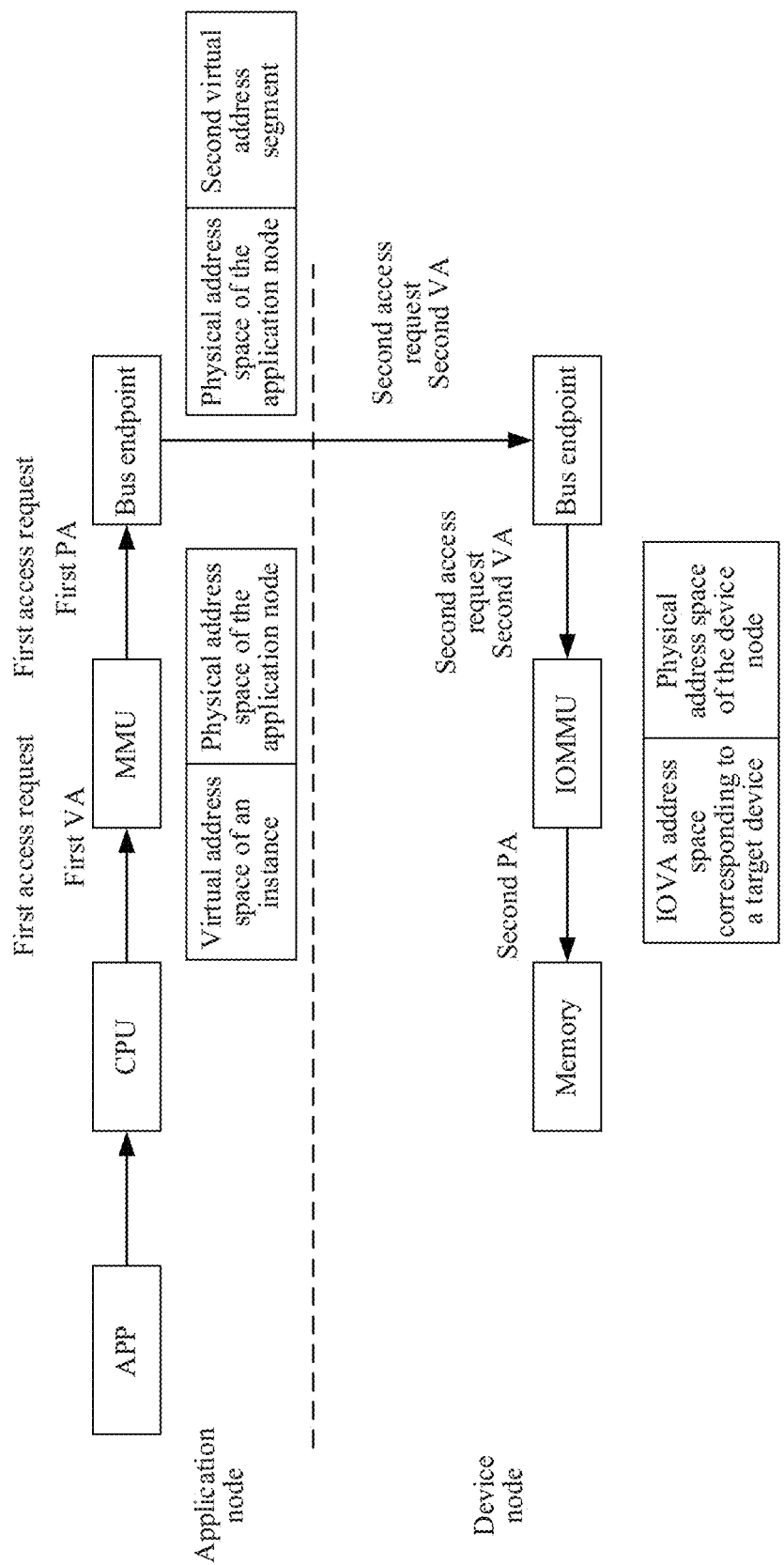
FIG. 6 is a schematic diagram of an address translation process in a device access method shown in FIG. 5.

FIG. 6 is a simplified schematic diagram of the process shown in FIG. 5, and shows an address translation process based on an address mapping relationship.

In some examples, the method further includes: the application node obtains a third access request, where the third access request includes a third virtual address; translates the third virtual address into a third physical address, where the third physical address is an address in the physical address space of the first network node, and does not belong to the first physical address segment; and accesses a device in the application node based on the third physical address.

Optionally, the third access request is initiated by a processor of the application node, and is used to access a local device in the application node. Alternatively, the third access request is initiated by a local device, and is used to access a memory of the application node. For example, the third access request includes but is not limited to a response to a configuration operation instruction, a DMA operation instruction, or an interrupt operation instruction.

Figure 7:
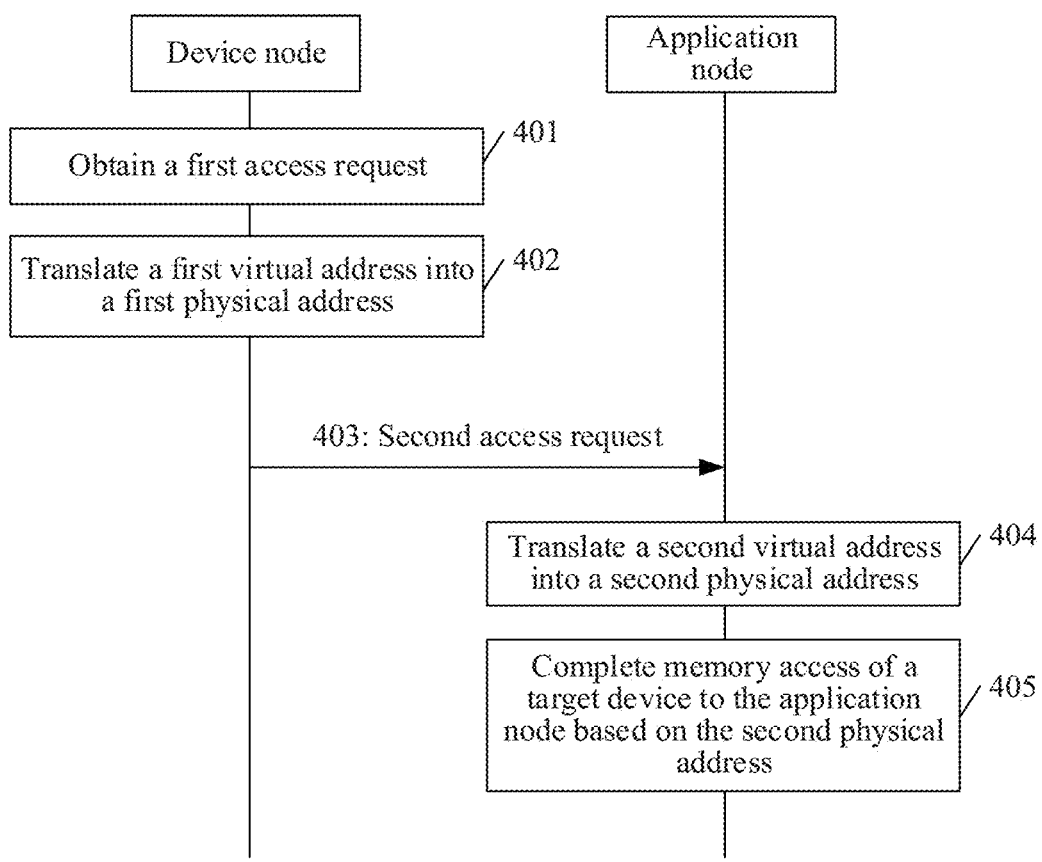
FIG. 7 is a flowchart of another access request processing method according to an example embodiment of the present disclosure.

FIG. 7 is a schematic diagram of an access request processing method according to an example embodiment of the present disclosure. In the method, an application node is a first network node, and may also be referred to as a destination network node, and a device node is a second network node, and may also be referred to as a source network node. As shown in FIG. 7, the method includes the following steps.

401: The device node obtains a first access request.

The first access request carries a first virtual address, and the first virtual address is an address in a virtual address space of the device node.

The first access request is initiated by a target device in the device node. The first access request is used to request to write data to the application node or read data from the application node. In some examples, the first virtual address is the target IOVA. For related content, refer to 301. A detailed description is omitted herein.

402: The device node translates the first virtual address into a first physical address.

An IOMMU of the device node stores a fourth address mapping relationship. The fourth address mapping relationship is a mapping relationship between an IOVA space corresponding to the target device and a physical address space of the device node. 402 includes: the IOMMU of the device node translates the first virtual address into the first physical address based on the fourth address mapping relationship.

The physical address space of the device node includes two types of physical address segments. A first-type physical address segment corresponds to a local device (including a peripheral device, a memory, and the like) of the device node. A second-type physical address segment corresponds to a non-local device of the device node, and is referred to as a second physical address segment below. The second physical address segment is a segment of physical addresses for which a bus endpoint of the device node is responsible.

403: When the first physical address belongs to the second physical address segment, the device node sends a second access request based on the first physical address.

For example, 403 includes:

Step 1: The IOMMU of the device node sends the first access request to the bus endpoint of the device node.

Herein, the first access request carries the first physical address. Because the first physical address belongs to the second physical address segment, the IOMMU sends the first access request carrying the first physical address to the bus endpoint of the device node through an internal bus of the device node. Correspondingly, the bus endpoint of the device node receives the first access request.

Step 2: The bus endpoint of the device node translates the first physical address into a second virtual address.

The second virtual address is a virtual address in a virtual address segment (that is, a first virtual address segment) that is in the application node and that is related to the target device, that is, a virtual address in the DMA memory segment or the interrupt memory segment.

The bus endpoint of the device node stores a second address mapping relationship. The second address mapping relationship is a mapping relationship between the physical address space of the device node and the first virtual address segment. The bus endpoint of the device node translates the first physical address into the second virtual address based on the second address mapping relationship.

Step 3: The bus endpoint of the device node sends the second access request to the application node.

The second access request carries the second virtual address. An access type corresponding to the second access request is the same as that corresponding to the first access request. The access type includes reading data or writing data. Correspondingly, a bus endpoint of the application node receives the second access request.

404: The application node translates the second virtual address into a second physical address.

For example, 404 includes: the bus endpoint of the application node sends the second access request to an IOMMU of the application node; and the IOMMU of the application node translates the second virtual address into the second physical address. The second physical address is a physical address in a physical address space of the application node.

The IOMMU of the application node stores a fifth address mapping relationship. The fifth address mapping relationship includes an address mapping relationship between an IOVA space of the application node and the physical address space of the application node. The IOMMU of the application node translates the second virtual address into the second physical address based on the fifth address mapping relationship.

405: The application node completes memory access of the target device to the application node based on the second physical address.

Optionally, the second access request is a read operation request or a write operation request.

In some examples, the second access request is a response to a synchronous configuration operation (belonging to a write operation request), and the target device writes a response result into a memory of the application node by using Store semantics.

In some other examples, the second access request is an asynchronous DMA write operation request. The target device writes a result into the memory of the application node by using asynchronous Write semantics.

In some other examples, the second access request is an asynchronous DMA read operation request. The target device reads a result from the memory of the application node to a memory of the device node by using asynchronous Read semantics.

In some other examples, the second access request is an asynchronous interrupt request (belonging to a write operation request). The target device writes an MSI interrupt vector table space specified by the application node. The bus endpoint of the application node monitors a write operation for the space, and forwards MSI data to an interrupt controller of the application node. The interrupt controller interrupts a CPU of the application node.

Figure 8:
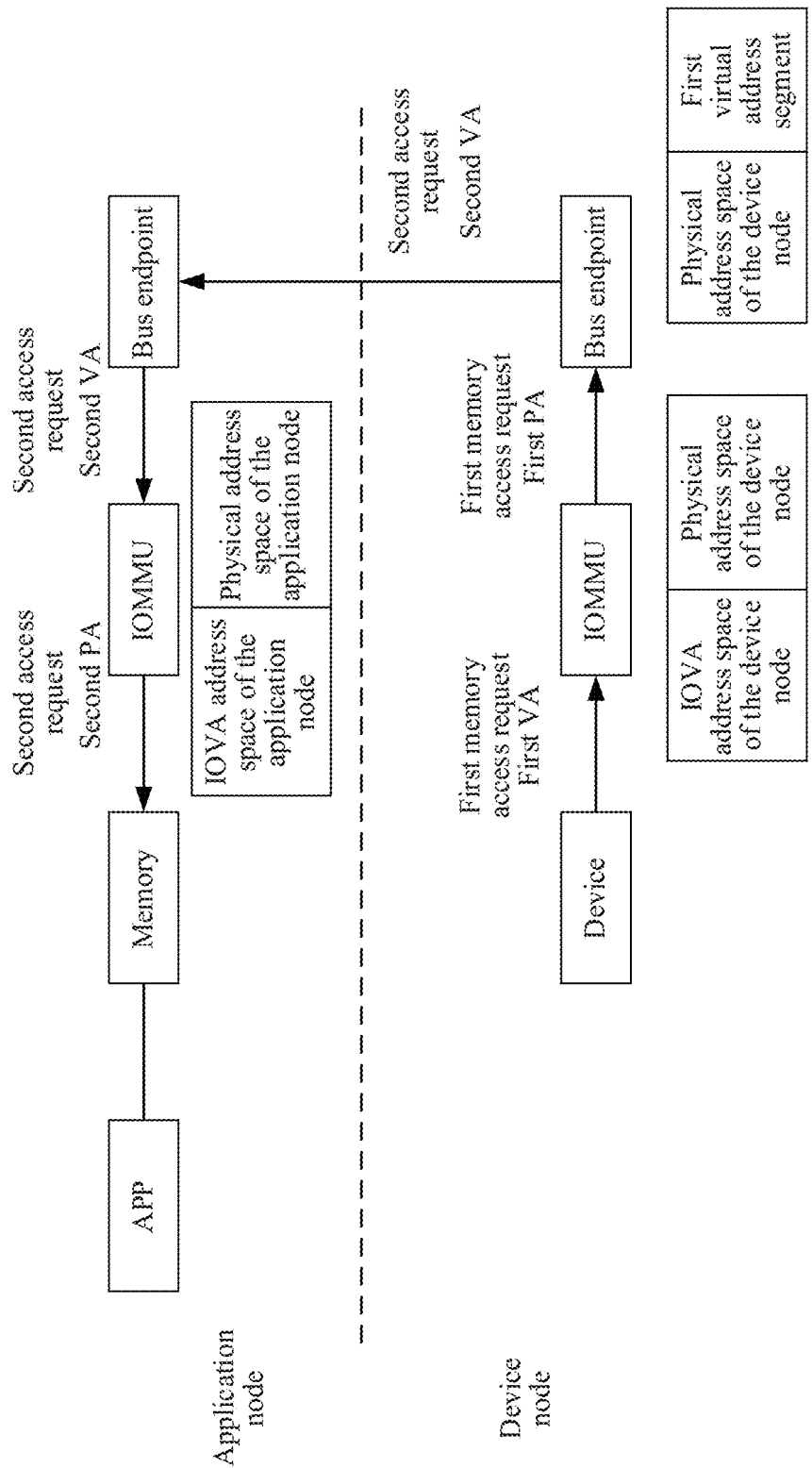
FIG. 8 is a schematic diagram of an address translation process in a device access method shown in FIG. 7.

FIG. 8 is a simplified schematic diagram of the process shown in FIG. 7, and shows an address translation process based on an address mapping relationship.

In embodiments of the present disclosure, an application node can invoke a device of a device node by using a mapping relationship that is based on a memory address, which reduces latency overheads as compared with an RDMA manner. In addition, unified management is performed on a local device of the application node and a remote device (that is, a non-local device of the application node), which helps decouple a physical location of the device from a use right, and implement sharing of a device resource.

Figure 9:
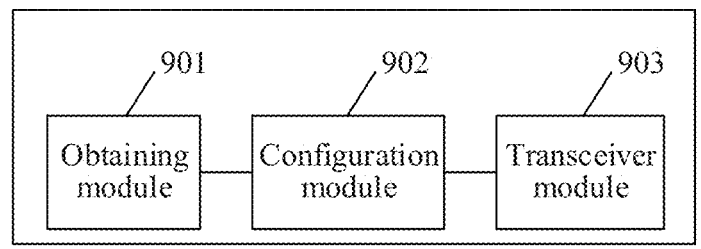
FIG. 9 is a schematic diagram of a structure of a network node configuration apparatus according to an example embodiment of the present disclosure.

FIG. 9 is a diagram of a structure of a network node configuration apparatus according to an embodiment of the present disclosure. The apparatus may be implemented as a part of the apparatus or the entire apparatus by using software, hardware, or a combination thereof. The apparatus provided in this embodiment of the present disclosure can implement the procedure of FIG. 3 in embodiments of the present disclosure. The apparatus may be applied to a network node, and the network node is a first network node or a second network node. As shown in FIG. 9, the apparatus includes an obtaining module 901 and a configuration module 902. The obtaining module 901 is configured to obtain address information of a virtual address segment related to a target physical device. The target physical device is a physical device that belongs to the second network node, the virtual address segment includes a first virtual address segment and a second virtual address segment, the first virtual address segment belongs to a virtual address space of the first network node and is used by the target physical device to access the first network node, and the second virtual address segment belongs to a virtual address space of the second network node and is used by the first network node to access the target physical device. The configuration module 902 is configured to configure an address mapping relationship based on the address information of the virtual address segment. The address mapping relationship is for transmission of an access request related to the target physical device, the address mapping relationship includes a first address mapping relationship and a second address mapping relationship, the first address mapping relationship is a mapping relationship between a physical address space of the first network node and the second virtual address segment, and the second address mapping relationship is a mapping relationship between a physical address space of the second network node and the first virtual address segment.

When the apparatus is applied to the first network node, the obtaining module 901 is configured to: allocate the first virtual address segment to the target physical device, to obtain address information of the first virtual address segment; and obtain address information of the second virtual address segment allocated by the second network node to the target physical device.

When the apparatus is applied to the second network node, the obtaining module 901 is configured to: allocate the second virtual address segment to the target physical device, to obtain address information of the second virtual address segment; and obtain address information of the first virtual address segment allocated by the first network node to the target physical device.

When the apparatus is applied to the first network node, the configuration module 902 is configured to: establish the first address mapping relationship based on the address information of the second virtual address segment, and store the first address mapping relationship; and send the address information of the first virtual address segment to the second network node, so that the second network node maintains the second address mapping relationship.

When the apparatus is applied to the second network node, the configuration module 902 is configured to: establish the second address mapping relationship based on the address information of the first virtual address segment, and store the second address mapping relationship; and send the address information of the second virtual address segment to the first network node, so that the first network node maintains the first address mapping relationship.

In some examples, the first network node includes a first bus endpoint, the first bus endpoint is configured to communicate with the second network node by using the first address mapping relationship, and the first address mapping relationship is a mapping relationship between the second virtual address segment and a physical address space that is in the first network node and that corresponds to the first bus endpoint. Alternatively, the second network node includes a second bus endpoint, the second bus endpoint is configured to communicate with the first network node by using the second address mapping relationship, and the second address mapping relationship is a mapping relationship between the first virtual address segment and a physical address space that is in the second network node and that corresponds to the second bus endpoint.

When the apparatus is applied to the first network node, the apparatus further includes: a transceiver module 903 configured to receive address information of an input/output virtual address IOVA segment from the second network node. The address information of the IOVA segment indicates an input/output virtual address space that is in the second network node and that corresponds to the target physical device, and the IOVA segment corresponds to the first virtual address segment. The configuration module 902 is further configured to store an address translation relationship between the first virtual address segment and the IOVA segment based on the address information of the IOVA segment.

For example, the address translation relationship is an offset between a start address of the first virtual address segment and a start address of the IOVA segment, and the offset is a constant.

For example, the first virtual address segment includes a first address sub-segment and a second address sub-segment, the first address sub-segment is used by the target physical device to initiate a direct memory access-based access request, and the second address sub-segment is used by the target physical device to initiate an interrupt request.

In some examples, the apparatus further includes a transceiver module 903. The transceiver module 903 is configured to send a get device request to a controller, where the get device request is used to request the controller to allocate a physical device; and receive device indication information sent by the controller, where the device indication information indicates the target physical device allocated by the controller for the first network node based on the get device request. The obtaining module 901 is further configured to determine the target physical device based on the device indication information.

Figure 10:
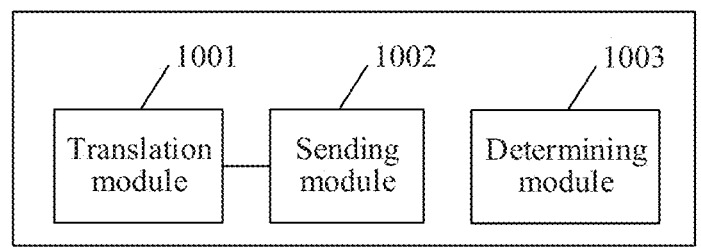
FIG. 10 is a schematic diagram of a structure of another access request processing apparatus according to an example embodiment of the present disclosure.

FIG. 10 is a diagram of a structure of an access request processing apparatus according to an embodiment of the present disclosure. The apparatus may be implemented as a part of the apparatus or the entire apparatus by using software, hardware, or a combination thereof. The apparatus provided in this embodiment of the present disclosure can implement the procedure of FIG. 5 or FIG. 7 in embodiments of the present disclosure, and the apparatus may be applied to a source network node. As shown in FIG. 10, the apparatus includes a translation module 1001 and a sending module 1002. The translation module 1001 is configured to translate a first virtual address into a first physical address. The first virtual address is a virtual address in a first access request. The sending module 1002 is configured to send a second access request to a destination network node based on the first physical address and a target address mapping relationship. The second access request corresponds to the first access request, and the target address mapping relationship is configured by using the method according to the first aspect and the possible implementations of the first aspect. The source network node is the first network node, the target address mapping relationship is the first address mapping relationship, and the first access request is an access request initiated by the first network node for the target physical device in the second network node; or the source network node is the second network node, the target address mapping relationship is the second address mapping relationship, and the first access request is an access request initiated by the target physical device for the first network node.

In some examples, the source network node is the first network node, the first access request further includes a target IOVA, the first access request indicates the target physical device to initiate access to the target IOVA, the target IOVA belongs to an IOVA segment, the IOVA segment belongs to an input/output virtual address space that is in the second network node and that corresponds to the target physical device, and corresponds to the first virtual address segment.

In some examples, the apparatus further includes a determining module 1003 configured to determine the target IOVA based on an address translation relationship between the first virtual address segment and the IOVA segment.

In some examples, the address translation relationship is an offset between a start address of the first virtual address segment and a start address of the IOVA segment, and the offset is a constant.

Division of the modules in embodiments of the present disclosure is an example, and is merely division of logical functions. In actual implementation, another division manner may be used. In addition, functional modules in embodiments of the present disclosure may be integrated into one processor, or may exist alone physically, or two or more modules may be integrated into one module. The integrated module may be implemented in a form of hardware, or may be implemented in a form of a software functional module.

If the integrated module is implemented in a form of a software function module and is sold or used as an independent product, the integrated module may be stored in a computer-readable storage medium. Based on such an understanding, the technical solutions of the present disclosure may be embodied in a form of a software product. The computer software product is stored in a storage medium, and includes several instructions for instructing a terminal device (which may be a personal computer, a mobile phone, a network device, or the like) or a processor to perform all or some steps of the method in embodiments of the present disclosure. The storage medium includes various media that can store program code, such as a Universal Serial Bus (USB) flash drive, a removable hard disk drive, a read-only memory (ROM), a random-access memory (RAM), a magnetic disk, or an optical disc.

It should be noted that when the device access apparatus provided in the foregoing embodiment performs device access, division of the foregoing functional modules is merely used as an example for description. In actual application, the foregoing functions may be allocated to and completed by different functional modules as required, that is, an internal structure of the apparatus is divided into different functional modules, to implement all or some of the functions described above. In addition, the device access apparatus provided in the foregoing embodiment belongs to a same concept as the device access method embodiment. For a specific implementation process, refer to the method embodiment.

Figure 11:
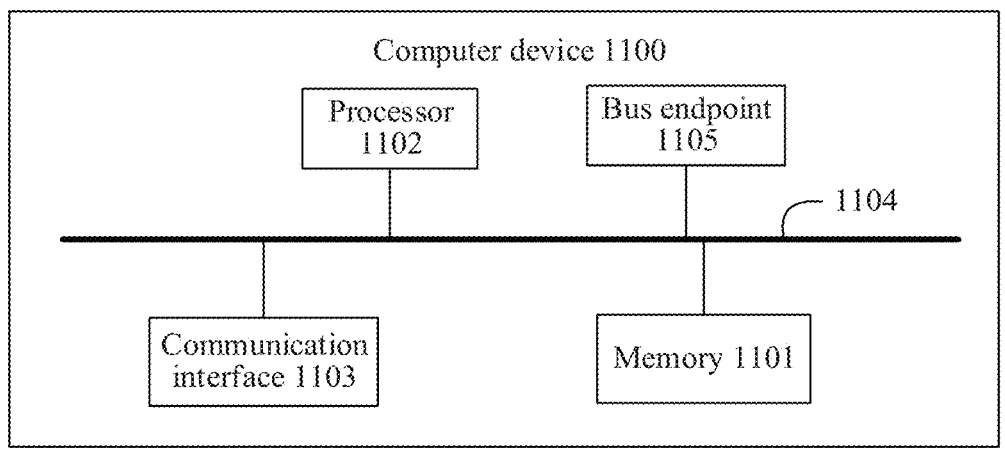
FIG. 11 is a schematic diagram of a structure of a computer device according to an example embodiment of the present disclosure.

An embodiment of the present disclosure further provides a computer device. FIG. 11 provides an example diagram of a possible architecture of a computer device 1100.

The computer device 1100 includes a memory 1101, a processor 1102, a communication interface 1103, a bus 1104, and a bus endpoint 1105. The memory 1101, the processor 1102, the communication interface 1103, and the bus endpoint 1105 implement communication connections to each other through the bus 1104.

The memory 1101 may be a ROM, a static storage device, a dynamic storage device, or a RAM. The memory 1101 may store a program. When the program stored in the memory 1101 is executed by the processor 1102, the processor 1102 and the communication interface 1103 are configured to perform the network node configuration method or the access request processing method. The memory 1101 may further store a data set. For example, some storage resources in the memory 1101 are allocated as a data set storage module, to store an address mapping relationship.

The processor 1102 may be a general-purpose CPU, a microprocessor, an ASIC, a GPU, or one or more integrated circuits.

Alternatively, the processor 1102 may be an integrated circuit chip, and has a signal processing capability. In an implementation process, some or all functions of the network node configuration apparatus or the access request processing apparatus in the present disclosure may be completed by using a hardware integrated logic circuit in the processor 1102 or instructions in a form of software. Alternatively, the processor 1102 may be a general-purpose processor, a DSP, an ASIC, an FPGA or another programmable logic device, a discrete gate or a transistor logic device, or a discrete hardware component. The processor may implement or perform the methods disclosed in the foregoing embodiments of the present disclosure. The general-purpose processor may be a microprocessor, or the processor may be another processor or the like. Steps of the method disclosed with reference to embodiments of the present disclosure may be directly performed by a hardware decoding processor, or may be performed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 1101. The processor 1102 reads information in the memory 1101, and completes some functions of the network node configuration apparatus or the access request processing apparatus in embodiments of the present disclosure in combination with hardware of the processor 1102.

The communication interface 1103 uses a transceiver module, for example but not limited to, a transceiver, to implement communication between the computer device 1100 and another device or a communication network. For example, an address information of a memory segment may be obtained through the communication interface 1103.

The bus 1104 may include a path for transmitting information between components (for example, the memory 1101, the processor 1102, and the communication interface 1103) of the computer device 1100.

The bus endpoint 1105 is configured to communicate with another bus endpoint.

The foregoing descriptions of procedures corresponding to accompanying drawings have respective focuses. For a part of a procedure that is not described in detail, refer to a related description of another procedure.

An embodiment of the present disclosure further provides a computer-readable storage medium. The computer-readable storage medium stores computer instructions, and when the computer instructions stored in the computer-readable storage medium are executed by a computer device, the computer device is enabled to perform the network node configuration method provided above or the access request processing method provided above.

An embodiment of the present disclosure further provides a computer program product including instructions. When the computer program product runs on a computer device, the computer device is enabled to perform the network node configuration method provided above or the access request processing method provided above.

An embodiment of the present disclosure further provides a chip, including a processing circuit and an interface circuit. The interface circuit and the processing circuit are interconnected through a line. The interface circuit is configured to receive a signal from a storage medium, and send the signal to the processing circuit. The signal includes computer instructions stored in the storage medium. When the computer instructions are executed by the processing circuit, the processing circuit is enabled to perform the network node configuration method or the access request processing method provided above.

An embodiment of the present disclosure further provides a communication system, including a first network node and a second network node. Both the first network node and the second network node are configured to configure an address mapping relationship in a corresponding manner in the first aspect and the possible implementations of the first aspect.

In some examples, the first network node and the second network node are further configured to initiate, in a corresponding manner in the second aspect and the possible implementations of the second aspect, an access request related to a target physical device.

All or some of the foregoing embodiments may be implemented by using software, hardware, firmware, or any combination thereof. When software is used for implementation, all or some may be implemented in a form of a computer program product. The computer program product includes one or more computer instructions. When the computer program instructions are loaded and executed on a server or a terminal, all or some of the procedures or functions based on embodiments of the present disclosure are generated. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (for example, a coaxial optical cable, an optical fiber, or a digital subscriber line (DSL)) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (such as a floppy disk, a hard disk drive, or a magnetic tape) or an optical medium (such as a digital video disk (DVD)) or a semiconductor medium (such as a solid state drive).

The foregoing descriptions are merely optional embodiments of the present disclosure, and are not intended to limit the protection scope of this application. Any variation or replacement readily figured out by a person skilled in the art within the technical scope disclosed in the present disclosure shall fall within the protection scope of this application. Therefore, the protection scope of this application shall be subject to the protection scope of the claims.

What is claimed is:

1. A method comprising:
   obtaining first address information of a first virtual address segment related to a target physical device belonging to a second network node, wherein the first virtual address segment comprises a second virtual address segment and a third virtual address segment, wherein the second virtual address segment belongs to a first virtual address space of a first network node and is for accessing the first network node, and wherein the third virtual address segment belongs to a second virtual address space of the second network node and is for accessing the target physical device; and
   configuring, based on the first address information, a first address mapping relationship for transmission of an access request related to the target physical device,
   wherein the first address mapping relationship comprises a second address mapping relationship and a third address mapping relationship,
   wherein the second address mapping relationship is between a first physical address space of the first network node and the third virtual address segment,
   wherein the third address mapping relationship is between a second physical address space of the second network node and the second virtual address segment, and
   wherein configuring the first address mapping relationship comprises:
   establishing the second address mapping relationship based on second address information of the third virtual address segment;
   storing the second address mapping relationship; and
   sending third address information of the second virtual address segment to the second network node.

2. The method of claim 1, wherein obtaining the first address information comprises:
   allocating the second virtual address segment to the target physical device to obtain second address information of the second virtual address segment; and
   obtaining third address information of the third virtual address segment.

3. The method of claim 1, further comprising communicating with the second network node using a first bus endpoint of the first network node and the second address mapping relationship, wherein the first physical address space corresponds to the first bus endpoint.

4. The method of claim 1, further comprising:
   receiving, from the second network node, second address information of an input/output virtual address (IOVA) segment corresponding to the second virtual address segment, wherein the IOVA segment belongs to an IOVA space in the second network node and corresponding to the target physical device; and
   storing an address translation relationship between the second virtual address segment and the IOVA segment based on the second address information.

5. The method of claim 4, wherein the address translation relationship is an offset between a first start address of the second virtual address segment and a second start address of the IOVA segment, and wherein the offset is a constant.

6. The method of claim 1, wherein the second virtual address segment comprises a first address sub-segment for initiating a direct memory access-based access request and a second address sub-segment for initiating an interrupt request.

7. The method of claim 1, further comprising:
   sending, to a controller, a get device request to allocate a physical device; and
   receiving, from the controller, device indication information indicating the target physical device allocated by the controller for the first network node based on the get device request.

8. An apparatus comprising
   a memory configured to store instructions; and
   a processor coupled to the memory and configured to execute the instructions to cause the apparatus to:
   obtain first address information of a first virtual address segment related to a target physical device belonging to a second network node, wherein the first virtual address segment comprises a second virtual address segment and a third virtual address segment, wherein the second virtual address segment belongs to a first virtual address space of a first network node and is for accessing the first network node, and wherein the third virtual address segment belongs to a second virtual address space of the second network node and is for accessing the target physical device; and
   configure, based on the first address information, first address mapping relationship for transmission of an access request related to the target physical device,
   wherein the first address mapping relationship comprises a second address mapping relationship and a third address mapping relationship, wherein the second address mapping relationship is between a first physical address space of the first network node and the third virtual address segment, wherein the third address mapping relationship is between a second physical address space of the second network node and the second virtual address segment, and wherein the instructions to configure the first address mapping relationship comprises:
  establishing the second address mapping relationship based on second address information of the third virtual address segment;
  storing the second address mapping relationship; and
  sending third address information of the second virtual address segment to the second network node.

9. The apparatus of claim 8, wherein the processor is further configured to execute the instructions to cause the apparatus to:
  allocate the second virtual address segment to the target physical device to obtain second address information of the second virtual address segment; and
  obtain third address information of the third virtual address segment.

10. The apparatus of claim 8, wherein the processor is further configured to execute the instructions to cause the apparatus to communicate with the second network node using a first bus endpoint of the first network node and the second address mapping relationship, wherein the first physical address space corresponds to the first bus endpoint.

11. The apparatus of claim 8, wherein the processor is further configured to execute the instructions to cause the apparatus to:
  receive, from the second network node, second address information of an input/output virtual address (IOVA) segment corresponding to the second virtual address segment, wherein the IOVA segment belongs to an IOVA space in the second network node and corresponding to the target physical device; and
  store an address translation relationship between the second virtual address segment and the IOVA segment based on the second address information.

12. The method of claim 1, wherein obtaining the first address information comprises:
  allocating the third virtual address segment to the target physical device to obtain second address information of the third virtual address segment; and
  obtaining third address information of the second virtual address segment.

13. The method of claim 1, wherein configuring the first address mapping relationship comprises:
  establishing the third address mapping relationship based on second address information of the second virtual address segment;
  storing the third address mapping relationship; and
  sending third address information of the third virtual address segment to the first network node.

14. The method of claim 1, further comprising communicating with the first network node using a first bus endpoint of the second network node and the third address mapping relationship, wherein the second physical address space corresponds to the first bus endpoint.

* * * * *